United States Patent
Mitchell et al.

(10) Patent No.: US 6,795,601 B1
(45) Date of Patent: Sep. 21, 2004

(54) ACHROMATIC OPTICAL SWITCHING/ROUTING SYSTEMS

(75) Inventors: Thomas A. Mitchell, Nazareth, PA (US); Thomas W. Stone, Hellertown, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/444,797

(22) Filed: May 23, 2003

(51) Int. Cl.[7] .............................. G02B 6/26; H04J 14/02
(52) U.S. Cl. ............................ 385/15; 385/16; 385/24; 385/37; 398/81; 398/84; 398/45; 398/49
(58) Field of Search ............................ 385/15, 16, 17, 385/18, 24, 123, 37; 398/81, 84, 45, 49

(56) References Cited

U.S. PATENT DOCUMENTS

| | | | |
|---|---|---|---|
| 4,786,124 A | 11/1988 | Stone et al. | 356/345 |
| 4,834,474 A | 5/1989 | George et al. | 372/25 |
| 5,396,349 A * | 3/1995 | Roberts et al. | 359/14 |
| 5,771,320 A | 6/1998 | Stone | 385/16 |
| 5,982,515 A | 11/1999 | Stone et al. | 359/111 |
| 6,304,696 B1 * | 10/2001 | Patterson et al. | 385/37 |
| 6,373,603 B1 * | 4/2002 | Popovich et al. | 359/15 |
| 2002/0018265 A1 * | 2/2002 | Graves | 359/128 |
| 2002/0176658 A1 * | 11/2002 | Prohaska | 385/24 |

* cited by examiner

Primary Examiner—Brian M. Healy (57) ABSTRACT

Methods and systems that compensate for the lateral chromatic dispersion and lateral shifts induced by the propagation through a switching/routing optical system. Utilizing the methods and systems of the present invention, an output of a switching/routing optical system that produces angularly dispersed output beams is achromatized by, first, deviating the output optical beam to a direction sufficient to induce lateral chromatic aberration of the opposite sign to that produced by the switching/routing optical system; and, then, re-deviating the deviated output optical beam to a predetermined direction, where a path length of the deviated output optical beam is a length sufficient to substantially compensate the chromatic dispersion induced by the switching/routing optical system.

20 Claims, 12 Drawing Sheets

ACHROMATIC OPTICAL SWITCHING/ROUTING SYSTEMS

BACKGROUND OF THE INVENTION

This invention relates generally to wavelength division multiplexed and/or high bandwidth optical communications systems, and more particularly to the compensation for chromatic dispersion in such systems.

With the advent of substantial new uses for electro/optic systems, there exists a greater need to efficiently switch Wavelength Division Multiplexed (WDM), and Dense Wavelength Division Multiplexed (DWDM), and/or high bandwidth signals on optical fibers.

U.S. patent Ser. No, 5,771,320 discloses a free space optical switching and routing system utilizing a switchable grating based approach together with novel noise suppression techniques. This family of devices provides for an optical switching and routing system that is useful for interconnecting any of an input array's optical channels to any of an output array's optical channels.

In systems such as the one described in U.S. patent Ser. No, 5,771,320, the beam paths, other than the un-deviated path, experience varying amounts of travel in an angularly dispersed condition. The longer the travel in the angularly dispersed condition, the larger the lateral displacements that accumulate between differing spectral components. This length of travel in the angularly dispersed condition increases as separation of the deviated path from the un-deviated path increases.

There is a need for methods and systems that compensate for the lateral chromatic dispersion and lateral shifts induced by the switching/routing optical system.

It is therefore an object of this invention to provide methods and systems that compensate for the lateral chromatic dispersion and the lateral shifts induced by the propagation of beams through the switching/routing optical system.

It is a further object of this invention to provide systems that that compensate for the lateral chromatic dispersion and lateral shifts induced by the propagation of beams through the switching/routing optical system which can be easily integrated into present switching/routing systems.

It is a still further object of this invention to provide a mirror array system for the deflection of beams in achromatized switching/routing optical systems and method of fabricating same.

SUMMARY OF THE INVENTION

The objects set forth above as well as further and other objects and advantages of the present invention are achieved by the embodiments of the invention described hereinbelow.

The present invention provides methods and systems that compensate for the lateral chromatic dispersion and lateral shifts induced by the propagation of beams through a switching/routing optical system.

In general, the output beams of switching/routing optical systems may be angularly and/or laterally dispersed. This invention relates to the compensation of lateral chromatic dispersion. The lateral chromatic dispersion in the beams can cause Wavelength Dependent Loss (WDL) in coupling to optical fibers or other transmission or detection devices.

Utilizing the method of the present invention, an output of an switching/routing optical system that produces lateral chromatic dispersion in the output beams is achromatized by adding an equal amount of lateral chromatic dispersion in the opposite direction for all outputs. This is accomplished by, first, deviating the output optical beam to a direction in an angular sense opposite to the angular sense of the dispersing portion of the switching/routing optical system; and, then, propagating the output optical beam a distance sufficient to substantially compensate the lateral chromatic dispersion induced by the switching/routing optical system; and, finally, deviating the output optical beam to an angular direction optically parallel to the original input beams of the switching/routing optical system.

A system of this invention includes a switching/routing sub-system, and a lateral chromatic corrector comprising a deviating optical sub-system and a re-deviating optical sub-system. The deviating optical sub-system is capable of deviating the output optical beam to a predetermined angular direction. In one embodiment, the predetermined angular sense of this deviation is opposite to the angular sense of the initial deviation produced by the switching/routing optical system. The re-deviating optical sub-system is capable of receiving the deviated output optical beam and re-deviating the deviated output optical beam to another predetermined angular direction that is optically parallel to the original angular direction of the input beam. The path length of the deviated output optical beam is sufficiently long to substantially compensate the lateral chromatic dispersion induced by the switching/routing optical system. In one embodiment, the deviating optical sub-system includes a deviating diffraction grating; and, the re-deviating optical sub-system includes a re-deviating diffraction grating. The gratings can be volume holographic diffraction gratings similar to those used in one embodiment of the switching/routing optical system.

For a better understanding of the present invention, together with other and further objects thereof, reference is made to the accompanying drawings and detailed description and its scope will be pointed out in the appended claims.

BRIEF DESCRIPTION OF THE DRAWINGS

FIG. 4b is a graphical schematic representation of a section of the prior art grating based switching/routing optical system of FIG. 4a;

DETAILED DESCRIPTION OF THE PREFERRED EMBODIMENTS

In order to better understand the present invention described below, it should be noted that certain terms used in the description of the invention have interchangeable usage. For example, the term "optical" refers not only to optical components, but also to electro-optical components and the terms "optical beam" and "electromagnetic radiation beam" may be used interchangeably.

Furthermore, terms such as "beam paths" and "channels" may also be interchanged, in certain instances, based upon their usage as recognized in the art.

The term "angular chromatic dispersion", or equivalently "angular dispersion", refers to the variation in angle of propagation with wavelength.

The term, "lateral chromatic dispersion", or equivalently "lateral chromatic shift" or "lateral shift", refers to the variation in spatial position with wavelength.

The term "achromatization" or equivalently "chromatic correction" refers to the sufficient correction of angular and/or lateral chromatic dispersion.

The term "physically parallel" refers to beams that are geometrically parallel, while the term "optically parallel" refers to beams that are geometrically parallel if re-directions due to fold mirrors are ignored.

In addition, identical components may be referred to with identical reference numerals within the specification and drawings for simplifying ah understanding of the various components of this invention.

Methods and systems that compensate for the lateral chromatic dispersion and lateral shifts induced by the propagation through a switching/routing optical system are disclosed herein below.

Figure 1:
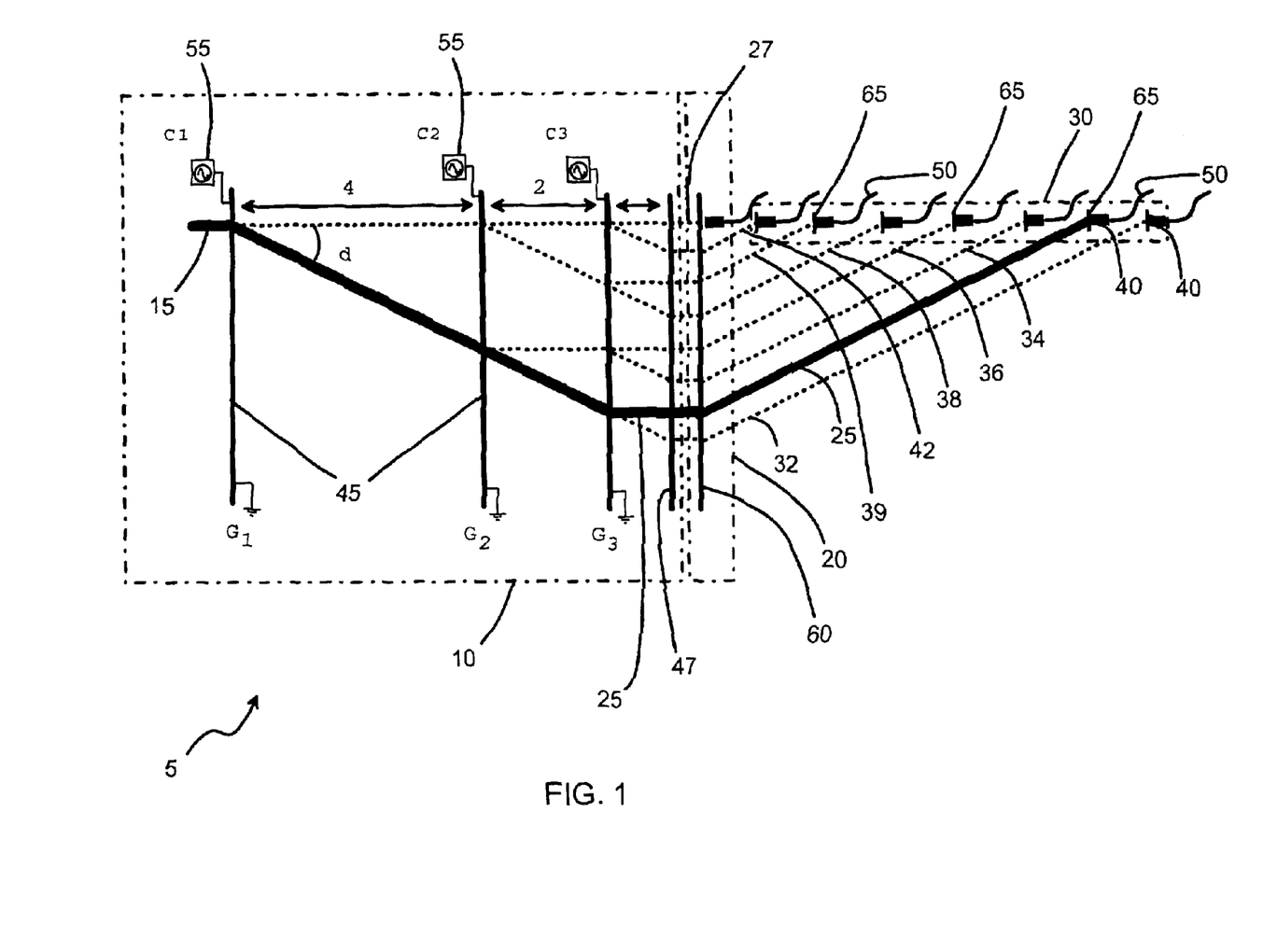
FIG. 1 is a graphical schematic representation of an embodiment of the achromatizing system of this invention.

FIG. 1 depicts a graphical schematic representation of an embodiment of the achromatized switching/routing optical system 5 of this invention. Referring to FIG. 1, an input beam of electromagnetic radiation (also referred to as an optical beam) 15 enters an switching/routing optical system 10. The input optical beam 15 is initially deviated when traversing the switching/routing optical system, resulting in an output beam 25. A deviating optical sub-system 20 can impart a deviation on the output optical beam 25. A re-deviating optical sub-system 30 can receive the deviated output optical beam and re-deviates the deviated output optical beam to a pre-determined position.

During operation of the switching/routing optical system 10, the input optical beam 15 is imparted an initial deviation by the switching/routing optical system 10. In the embodiment shown in FIG. 1, during operation of the achromatized switching/routing optical system 5 of this invention, the deviating optical sub-system 20 deviates the output optical beam 25 to a direction symmetrically opposite to the initial deviation produced by the switching/routing optical system 10. The re-deviating optical sub-system 30 re-deviates the deviated output optical beam to a predetermined direction. The path length of the deviated output optical beam 25 is sufficiently long to substantially compensate the lateral chromatic dispersion induced by the switching/routing optical system 10.

In the embodiment shown in FIG. 1, the switching/routing optical system 10 includes switchable gratings 45, each switchable grating 45 controlled by a control source 55. In the embodiment shown in FIG. 1, the deviating optical sub-system 20 includes a dispersion compensating diffraction grating 60 and the re-deviating optical sub-system 30 includes an array of compensating diffraction gratings, each compensating grating 65 optically disposed in front of each fiber coupling lens 40 for each fiber output 50.

Various different initial deviations are imparted by the switching/routing optical system 10. The beam path of the output beam 25 can be as shown in FIG. 1 or any of the other possible beam paths 27, 32, 34, 36, 38, 39, 42. During operation of embodiment shown in FIG. 1, the output beam is re-deviated into the coupling lens 40 by the corresponding diffraction grating 65. In order to enable the lateral chromatic dispersion compensation of the possible beam paths 25, 32, 34, 36, 38, 39, and 42 one diffraction grating 65 is needed for each fiber coupling lens 40.

The beam propagating through all gratings in the transmissive state 27 experiences no angular dispersion and so accumulates no lateral shifts. It can be directly coupled into a corresponding optical fiber 50 as shown.

The other beam paths 25, 32, 34, 36, 38, 39, 42, however, experience varying amounts of travel in an angularly dispersed condition. The longer the travel in the angularly dispersed condition, the larger the displacements that accumulate between differing spectral components. This length of travel in the angularly dispersed condition increases as the position in the center plane approaches the bottom of the configuration. Using a steering grating 47 to make each of the paths exit parallel to the input will achromatize the angular dispersion, but this will not eliminate the accumulated lateral shifts. In the embodiment of FIG. 1, the beams are symmetrically returned to the base from which they were first deviated using gratings 60 and 65, thus recombining the differing spectral components of a given switch path and eliminating the lateral shifts formerly present. Accordingly, by deviating the beams in an angular direction opposite to the initial deviations, a compensating dispersion is introduced (i.e., the different spectral components now approach each other as they propagate, rather than separating as before).

Referring again to FIG. 1, a preferred method for this compensation is to use a volume holographic transmission diffraction grating as the dispersion compensating diffraction grating 60 in the deviating optical sub-system 20. The compensating grating 60 should have the same spatial frequency as the switched gratings 45 utilized in the switching/routing optical system 10. Alternatively, the steering grating 47 can be combined with the compensating grating 60, as in FIG. 2, such that for the beams that are still angularly dispersed (i.e., not traveling parallel to the input beam) the combined grating should have twice the spatial frequency as the switched gratings 45 utilized in the switching/routing optical system 10. A pixellated or segmented compensating grating may be used for the combined steering/compensation grating. Note the spectral bandwidth is broader for a single twice frequency grating than for a pair of single frequency gratings for these applications. For beams that are not angularly dispersed (i.e., those incident on the center plane in a direction parallel to the input beam as shown), the compensating grating pixel should have a spatial frequency equal to that of the switched gratings. In other words, all the beams should be diffracted symmetrically about a center plane with respect to the switching/ routing optical system 10, as shown in FIG. 1. Thus, propagation through the first half of the system separates the components laterally, while propagation through the second half of the system symmetrically combines the components laterally as shown.

At a symmetric distance through the second half of the system, the lateral recombination is complete, and gratings (of the same frequency as the switched gratings) are used to diffract all the spectral components to a common exit angle. At this point, all spectral components are exiting with identical spatial location as well as identical angular direction for each output optical beam. As a result, conventional fiber coupling techniques, such as a fiber coupling lens 40, can be used with high efficiency.

The fiber coupling lenses 40, in one embodiment, can incorporate the final grating on a gradient-index rod lens face using mass-produced lithographically fabricated "binary" optic gratings. Alternatively, volume diffraction elements may be used.

Figure 2:
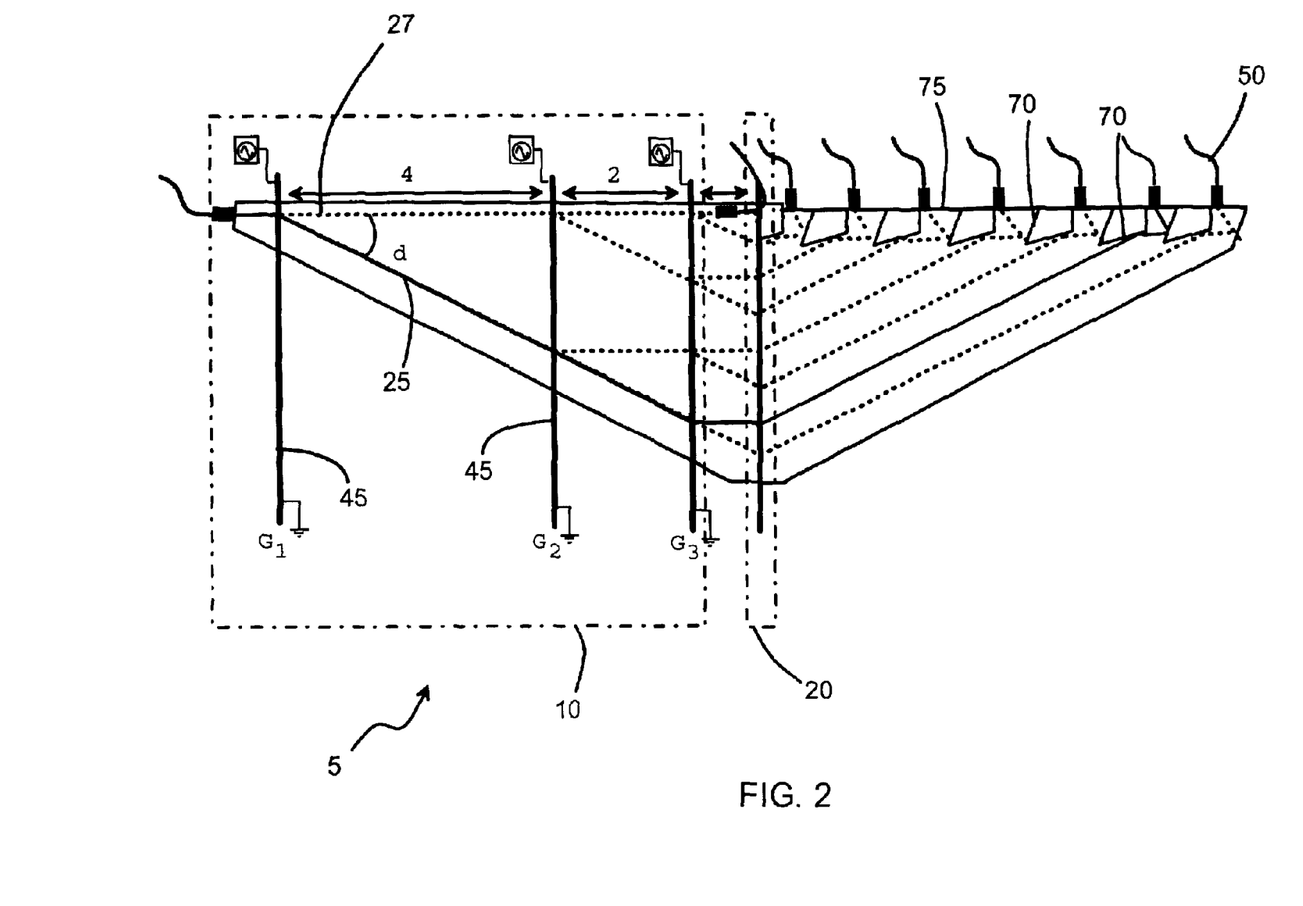
FIG. 2 is a graphical schematic representation of another embodiment of the achromatizing system of this invention.

Another embodiment of the achromatized switching/ routing optical system 5 of this invention is shown in FIG. 2. Referring to FIG. 2, the achromatized switching routing optical system 5 also includes an array of reflecting components, each reflecting component 70 optically disposed to reflect an optical beam towards the location of the corresponding fiber coupling lens 40. In the embodiment of FIG. 2, the array of compensating gratings 65 in the embodiment of FIG. 1 is replaced with a single grating 75 that is used simultaneously for all fiber outputs 50. Also in the embodiment of FIG. 2, the direction of the re-deviated beam is optically parallel, but physically perpendicular to the direction of the input beam.

During operation of the embodiment of FIG. 2, the deviating optical sub-system 20 deviates the output optical beam 25 to a direction symmetrically opposite to the initial deviation produced by the switching/routing optical system 10. The reflecting component 70 reflects the deviated output optical beam 25 in order to redirect the deviated output optical beam 25. The reflecting component 70 is capable of reflecting the deviated output optical beam 25 in an even number of reflections, thereby avoiding left-right reversals. The path length of the deviated output optical beam 25, from the deviating optical sub-system 20 to the re-deviating optical subsystem 30, is sufficiently long to substantially compensate the lateral chromatic dispersion induced by the switching/routing optical system 10. The re-deviating optical subsystem 30, comprised of the single grating 75, re-deviates the deviated output optical beam 25.

Figure 3:
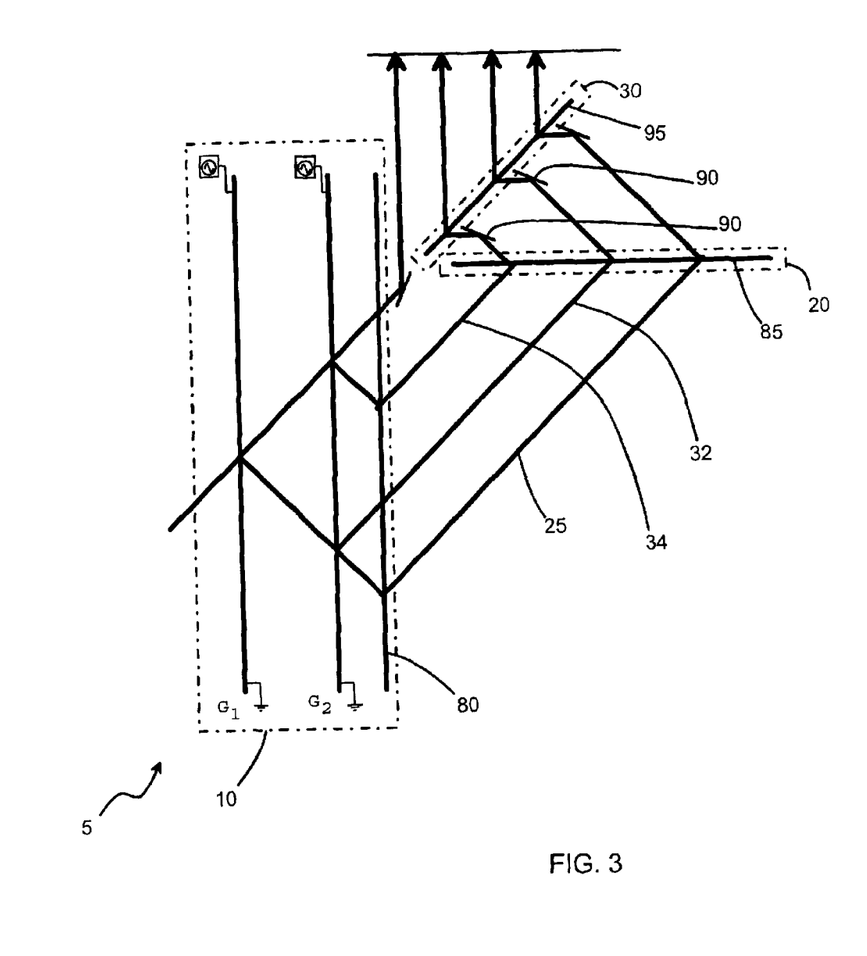
FIG. 3 is a graphical schematic representation of yet another embodiment of the achromatizing system of this invention.

A third embodiment of the achromatized switching/ routing optical system 5 of this invention is shown in FIG. 3. In the embodiment shown in FIG. 3 the deviating optical sub-system 20 includes a first diffraction grating 85 capable of deviating the output optical beam 25 in order to render the deviated output optical beam optically anti-parallel to the initial deviation imparted by the switching/routing optical system 10 and a second diffraction grating 95 capable of subsequently re-deviating the deviated optical beam 25. This third embodiment also includes an array of reflecting components, each reflecting component 90 optically disposed to reflect a beam propagating along one of the optical paths 25, 32, 34 towards the compensating diffraction grating 95. The reflecting component 90 is capable of reflecting the subsequently deviated output optical beam 25 in order to redirect the subsequently deviated output optical beam 25. In the implementation shown in FIG. 3, the re-deviating optical subsystem 30 includes a fixed compensating diffraction grating 95.

During operation of the embodiment of FIG. 3, the steering diffraction grating 80 is used to align all of the output optical beams from the switching/routing optical system 10 to a common direction that is optically parallel to the input optical beam 15, and so compensates for angular dispersion. In one implementation, the steering diffraction grating 80 is a grating array comprised of regions of grating next to "through" regions where no modulation exists. [The pitch of the alternation will be fast (fine) for decreasing grating plane separation in the switching/routing optical system 10 and slow (coarse) (e.g., semi-field) for increasing grating plane separation]. The single diffraction grating 85 introduces identical angular dispersion as that introduced by the switching/routing optical system 10, but in the opposite sense such that the spectral components are now approaching each other rather than separating. The reflecting component 90 reflects the deviated output optical beam 25 in order to redirect the deviated output optical beam 25. The reflecting component 90 is capable of reflecting the deviated output optical beam 25 in an even number of reflections, thereby avoiding left-right reversals. Finally, the re-deviating optical sub-system 30, comprised of the single diffraction grating 95, intersects the beam paths 25, 32, 34 at a symmetric distance where all of the spectral components in each of the beam paths 25, 32, 34 are overlapping spatially. Prior to this re-deviating optical sub-system 30 the spectral components are angularly dispersed, arid after they are all co-linear. In this embodiment the spatial frequency of each of the gratings 80, 85, and 95 is identical.

Figure 4A:
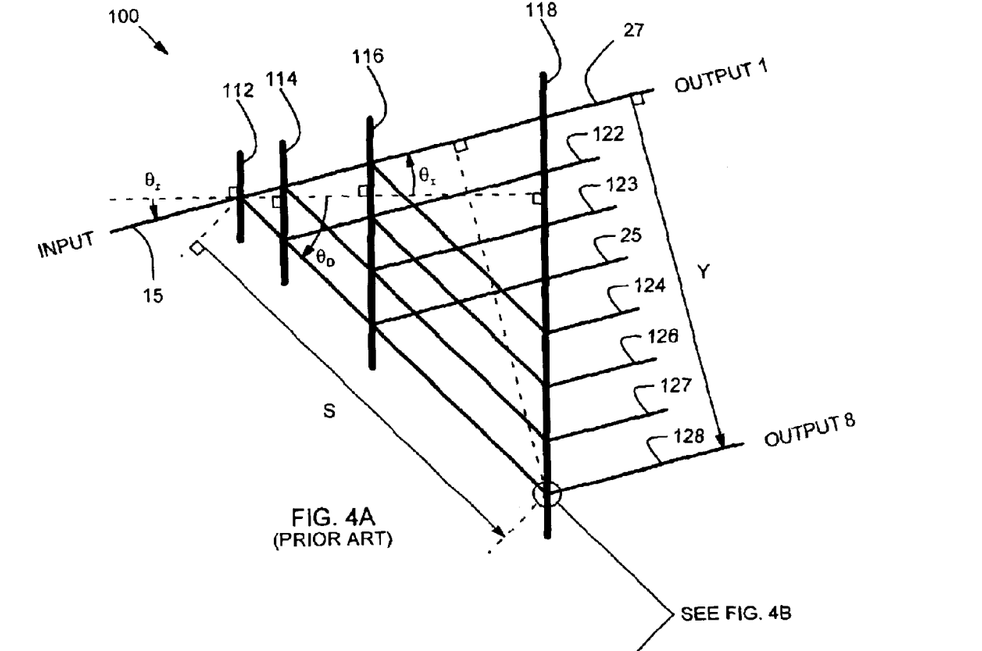
FIG. 4a is a graphical schematic representation of a prior art grating based switching/routing optical system.
Figure 4B:
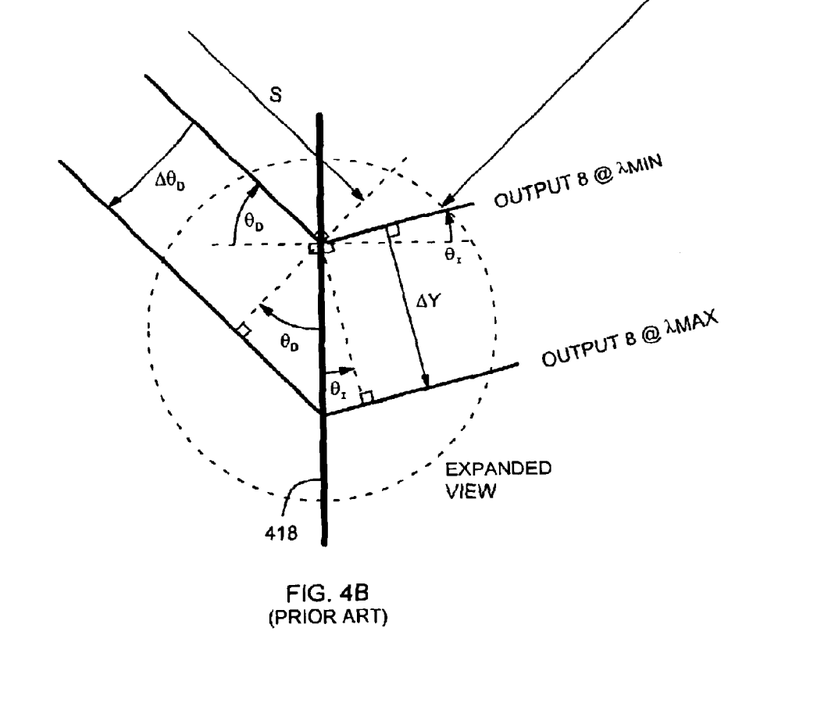

FIGS. 4a, 4b illustrate a prior art grating based switching/ routing system 100 including four switchable gratings 112, 114, 116, and steering grating 118 that may also be switchable. The operation of the switching/routing system 100 is described in U.S. Pat. Ser. No. 5,982,515. Due to the diffractive nature of the grating based switching/routing system, it suffers from a lateral chromatic shift that varies with each output channel. FIG. 4b depicts the diffraction of an optical beam 128 by the steering grating 118 and illustrates the lateral chromatic shift. This lateral shift, referenced as $\Delta Y$, is measured perpendicular to the beams direction of propagation and, in one embodiment, can be quantified according to the equation $$\frac{\Delta Y}{Y} \approx \frac{\sin\theta_I - \sin\theta_D}{\sin(\theta_I - \theta_D)} \frac{\cos\theta_I}{\cos^2\theta_D} \frac{\Delta\lambda}{\lambda}$$

where Y represents the separation distance between the un-deviated and most deviated channels, $\theta_I$ is the angle of incidence as shown in FIG. 4a, $\theta_D$ is the angle of diffraction as shown in FIG. 4b, and where the bandwidth, $\Delta\lambda$ is much smaller than the wavelength, $\lambda$. From this equation, the lateral chromatic shift of the grating based switching/routing system decreases with increasing grating angle of incidence. In this manner, the lateral chromatic shift introduced by the grating based switching/routing system can be significantly reduced by maximizing the input grating angle of incidence, which may provide a sufficient degree of achromatization for certain applications.

Figure 5A:
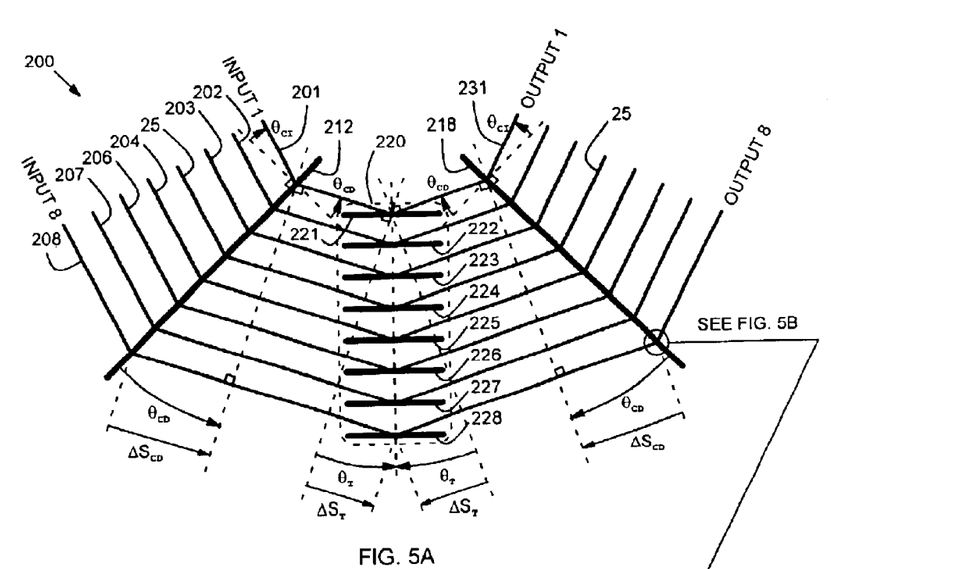
FIG. 5a is a graphical schematic representation of a fourth embodiment of the achromatizing system of this invention.

FIG. 5a depicts a fourth embodiment 200 of the chromatic corrector portion of this invention. In the embodiment shown in FIG. 5a, the deviating optical sub-system includes a diffraction grating 212 slanted with respect to the direction of the input optical beam 15. The diffraction grating 212 receives the output beam 25 from the switching/routing optical system 100 and deviates the output beam 25. While the output beam 25 is utilized herein in order to discuss the operation of the embodiment of FIG. 5a, the mode of operation is also characteristic of any other of the possible beam paths 201, 202, 203, 204, 206, 207, or 208.

Figure 5B:
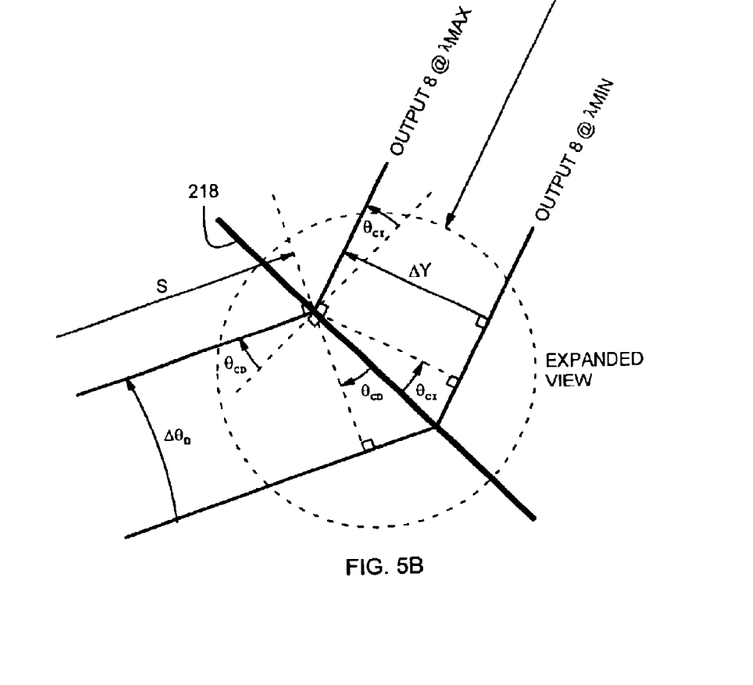
FIG. 5b is a graphical schematic representation of a section of the fourth embodiment of the achromatizing system of this invention.

The deviating optical sub-system also includes a reflecting component 220 (in a specific embodiment, comprised of one of the mirrors 221, 222, 223, 224, 225, 226, 227, and 228 from a mirror array 220) capable of redirecting the deviated output optical beam 25. In the embodiment of FIG. 5a, the re-deviating optical sub-system includes a diffraction grating 218 slanted with respect to the direction of the input optical beam 15. The reflecting component 220 is optically disposed between the diffraction grating 212 and the diffraction grating 218. FIG. 5b depicts the diffraction of an optical beam 208 by the diffraction grating 218 and illustrates the compensating lateral chromatic shift introduced.

During operation of the embodiment 200 shown in FIG. 5a, the diffraction grating 212 deviates the output optical beam 25 in a predetermined direction (as can be seen in FIG. 5a). The reflecting component 220 redirects the deviated optical beam 25. Depending on the selected output optical beam, the position along the slanted diffraction grating 212 at which diffraction grating 212 receives the output beam will vary, thereby causing the diffracted path length and the resulting lateral chromatic shift to vary. This lateral chromatic shift (referred to as $\Delta Y$ hereinafter) is measured perpendicular to the direction of propagation of the beam and can be quantified, in one enbodiment, according to the following equation:

$$\frac{\Delta Y}{Y} \approx 2(\tan\theta_{CD} + \tan\theta_T) \frac{\sin\theta_{CI} - \sin\theta_{CD}}{\cos\theta_{CD}} \frac{\Delta\lambda}{\lambda}$$

where $\theta_{CI}$ and $\theta_{CD}$ are the grating angle of incidence and diffraction respectively for the corrector gratings 212 and 218, and $\theta_T$ is the tilt of the mirror array assembly 220 relative to the beams.

For the special cases where $\theta_{CI} = -\theta_{CD}$ and $\theta_T = \theta_{CD}$, the expression for the lateral chromatic shift reduces to $$\frac{\Delta Y}{Y} \approx -8 \tan^2\theta_{CD} \frac{\Delta\lambda}{\lambda}.$$

The slant angle of the diffraction grating 212 with respect to the output beam 25 ($\theta_{CI}$), the angle of incidence of the deflected beam at the reflecting component 220 ($\theta_T$), and the bandwidth relative to the wavelength $$\left(\frac{\Delta\lambda}{\lambda}\right)$$

determine the lateral chromatic shift induced by the embodiment 200 of the chromatic corrector portion of this invention shown in FIG. 5a.

Figure 5C:
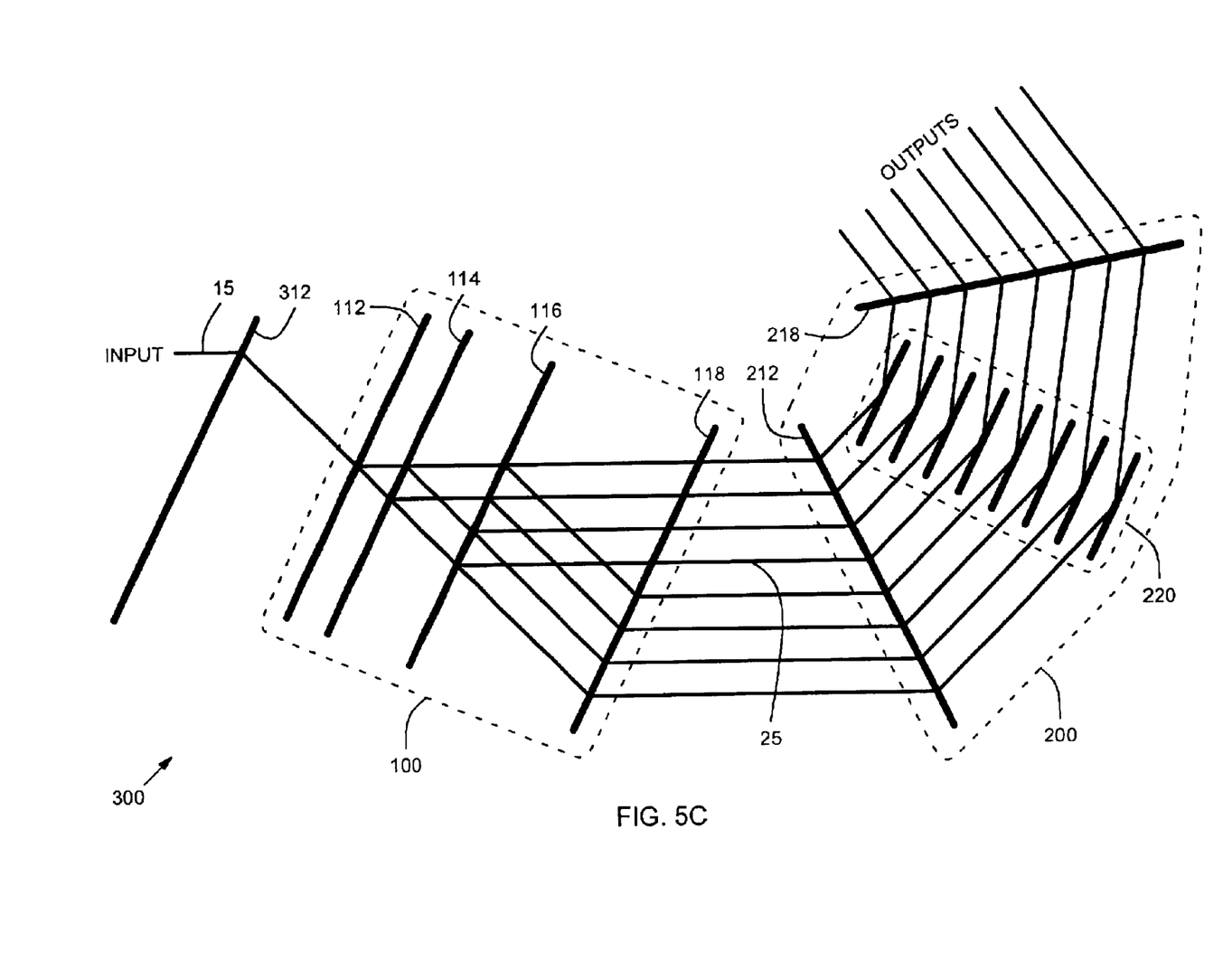
FIG. 5c is a graphical schematic representation of a fourth embodiment of the achromatizing system of this invention being utilized to achromatize the output of a switched grating based optical switching/routing system.

Shown in FIG. 5c is a lateral chromatic shift corrected grating based switching/routing optical system 300 with no lateral chromatic shift at the output. The corrected grating based switching/routing optical system 300 includes a grating based switching/routing optical system 100 concatenated with the grating based lateral chromatic corrector 200 of FIG. 5a. The concatenation of devices 100 and 200 removes the component of the lateral chromatic shift that varies with output. Because of the finite extent of the mirrors necessary to reflect a beam of a given size, an constant amount of overcorrected lateral chromatic shift is introduced into all output beams. The diffraction grating 312 at the input to the device provides an additional amount of undercorrected lateral chromatic shift to all channels in order to balance the overcorrected lateral chromatic shift that is constant with all outputs. In this manner, the net lateral chromatic shift at the outputs is rendered essentially equal to zero.

Figure 6A:
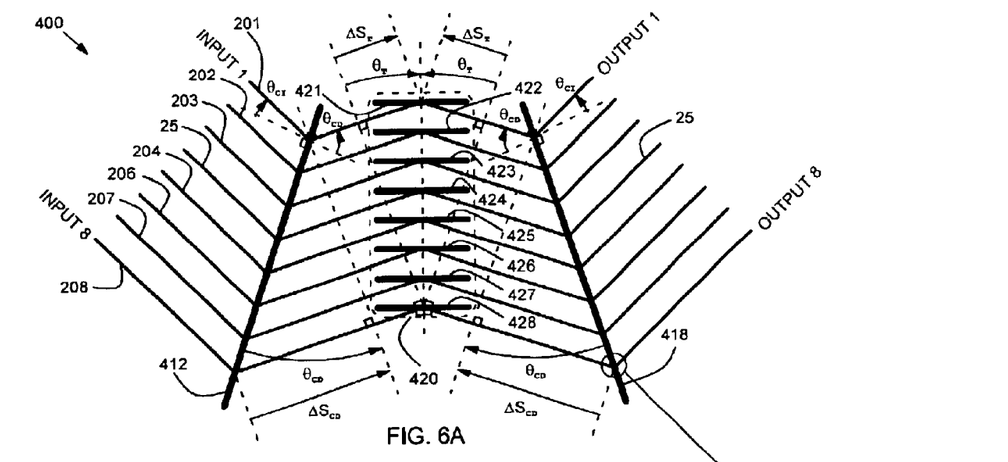
FIG. 6a is a graphical schematic representation of a fifth embodiment of the achromatizing system of this invention.
Figure 6B:
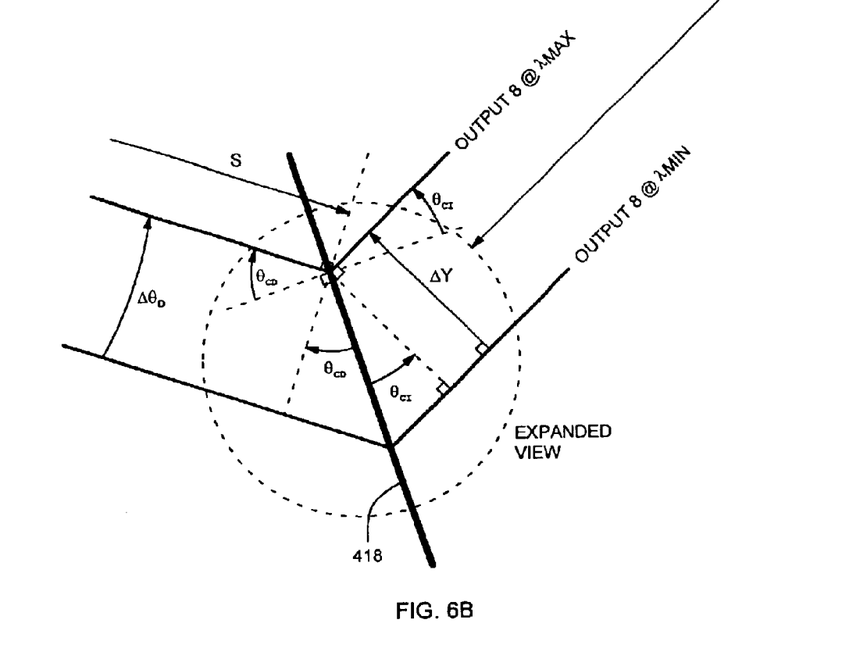
FIG. 6b is a graphical schematic representation of a section of the fifth embodiment of the achromatizing system of this invention.

A fifth embodiment 400 of the achromatizing system 5 of this invention is shown in FIG. 6a. The embodiment 400 of the system 5 of this invention shown in FIG. 6a is similar to the embodiment 200 of the chromatic corrector portion of this invention. Referring to FIG. 6a, the reflecting component 420 has a different orientation from that of the reflecting component 220 of FIG. 5a. The lateral chromatic shift in the embodiment 400 of FIG. 6a is given by the same equation (described above) as presented for the embodiment 200 of FIG. 5a. FIG. 6b depicts the diffraction of an optical beam 208 by the diffraction grating 418 and illustrates the compensating lateral chromatic shift introduced.

Figure 6C:
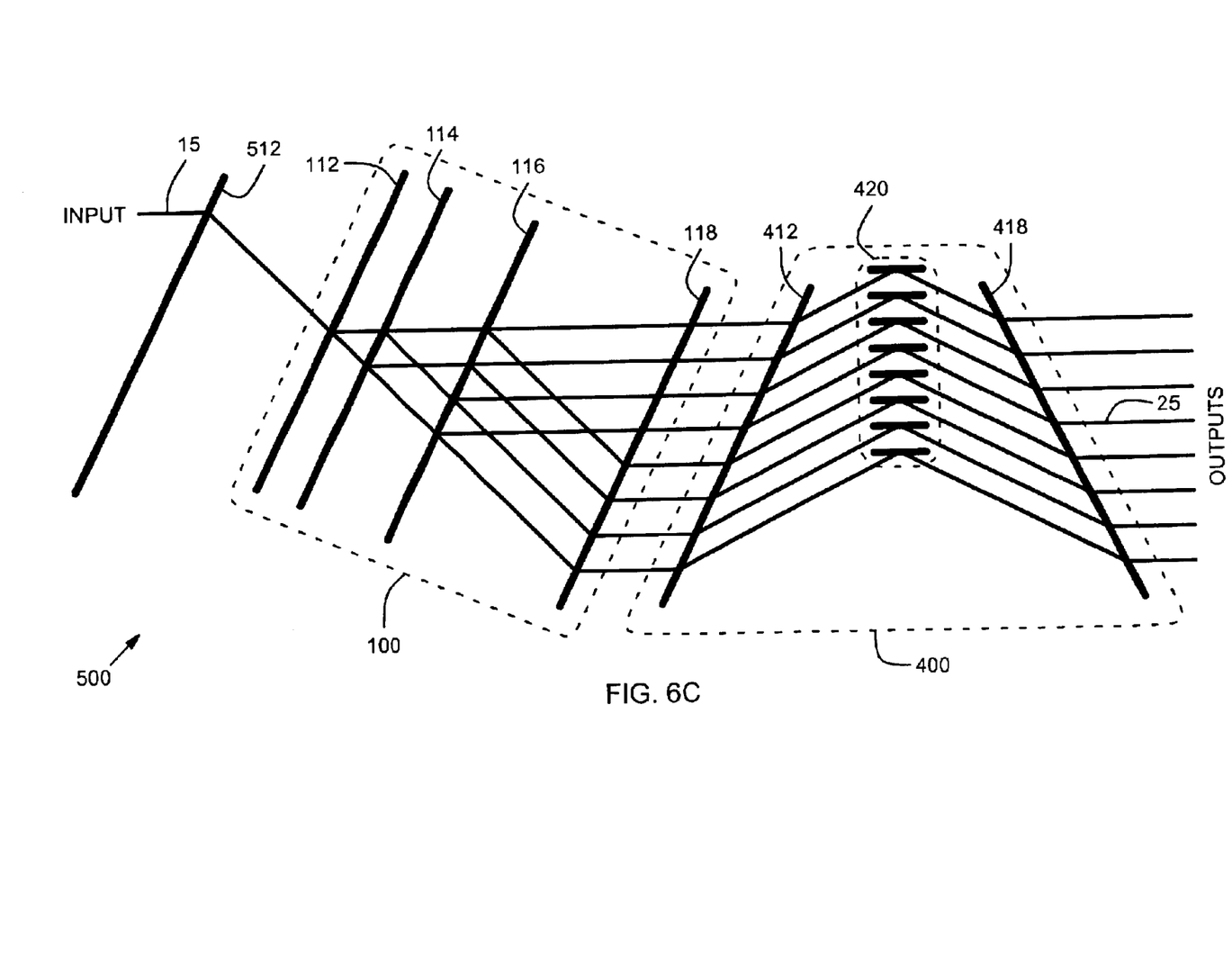
FIG. 6c is a graphical schematic representation of a fifth embodiment of the achromatizing system of this invention being utilized to achromatize the output of a switched grating based optical switch.

Shown in FIG. 6c is a lateral chromatic shift corrected grating based switching/routing optical system 500 with no lateral chromatic shift at the output. The corrected grating based switching/routing optical system 500 includes a grating based switching/routing optical system 100 concatenated with the grating based lateral chromatic corrector 400 of FIG. 5a. The concatenation of devices 100 and 400 removes the component of the lateral chromatic shift that varies with output, while the diffraction grating 512 at the input to the device provides an additional amount of undercorrected lateral chromatic shift to all channels in order to balance the overcorrected lateral chromatic shift that is constant with all outputs. In this manner, the net lateral chromatic shift at the outputs is rendered essentially equal to zero.

The total angular deviation between any output optical beam of the switching/routing optical system 100 (such as beams 201–208 in FIG. 4a) and the corresponding output beam of the achromatized switching/routing optical system 500, can be expressed as $$\theta_{TOTAL} = 2(\theta_T + \theta_{CD} - \theta_{CI})$$

For the special cases where $\theta_T = \theta_{CI} - \theta_{CD}$, the total angular deviation is zero, making the input and output beams physically parallel, and the expression for the lateral chromatic shift, in one embodiment, reduces to $$\frac{\Delta Y}{Y} \approx 2 \frac{\sin\theta_{CI}}{\cos(\theta_{CI} - \theta_{CD})} \frac{\sin\theta_{CI} - \sin\theta_{CD}}{\cos^2\theta_{CD}} \frac{\Delta\lambda}{\lambda}$$

Figure 7A:
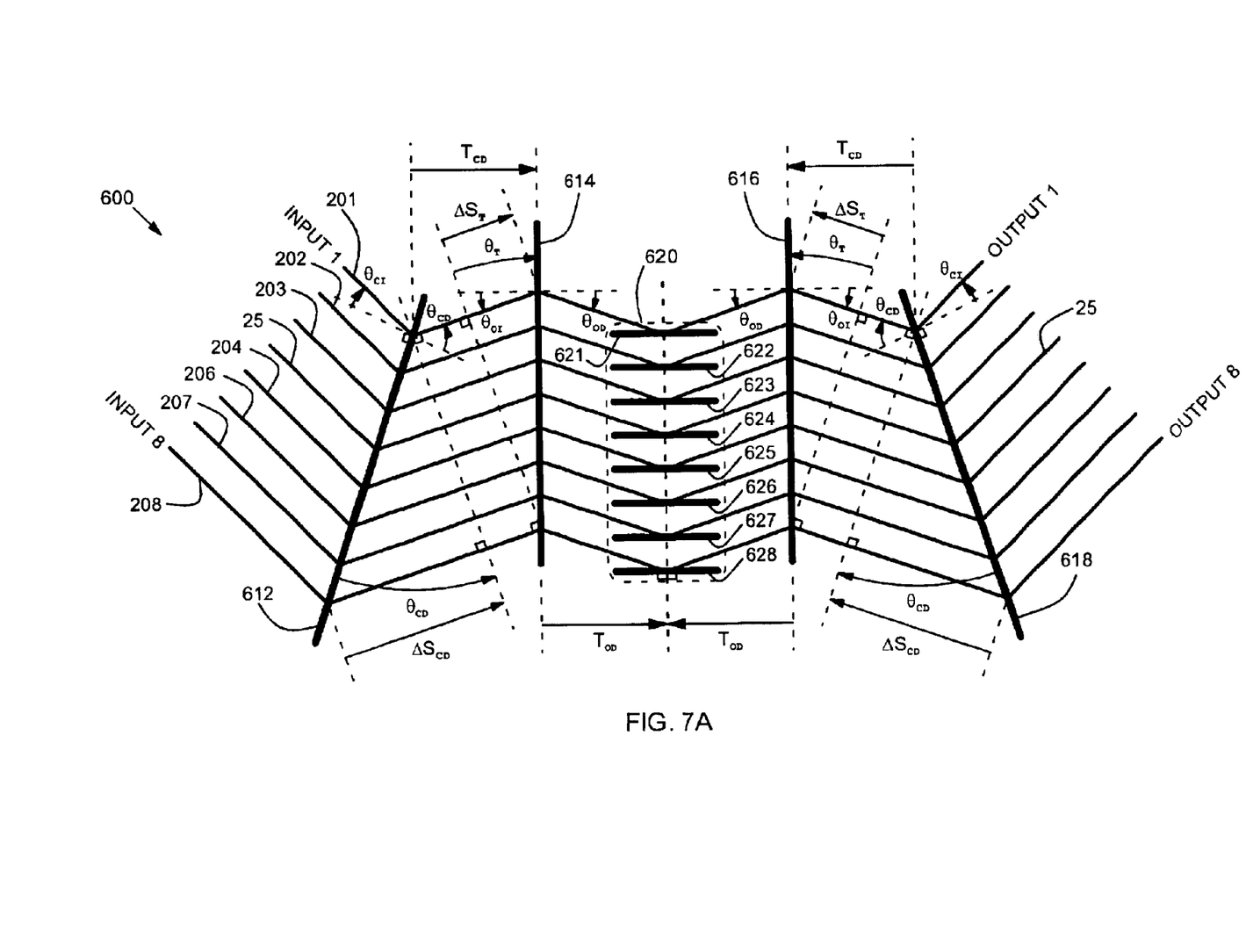
FIG. 7a is a graphical schematic representation of a sixth embodiment of the achromatizing system of this invention.

It should be noted that other embodiments of the achromatized switching/routing optical system 500 of this invention including more than one diffraction grating in the deviating and re-deviating optical sub-systems are possible and the equation for the lateral chromatic shift can be obtained by the same methods utilized to obtain the equations above. An exemplary embodiment is shown in FIG. 7a. The modification to the embodiment 500 of FIG. 5a shown in FIG. 7a requires the use of two additional static gratings that surround the array of fold mirrors.

In the embodiment 600, shown in FIGS. 7a, 7b, the deviating optical sub-system includes a first diffraction grating 612 slanted with respect to the direction of the input optical beam 15, the first diffraction grating 612 being capable of receiving the output beam 25 from the switching/routing optical system 100 and subsequently deviating the output beam 25, and, a second diffraction grating 614. The deviating optical sub-system also includes a reflecting component 620 (in a specific embodiment, one of the mirrors 621, 622, 623, 624, 625, 626, 627, 628 from a mirror array 620) capable of redirecting the deviated output optical beam 25. In the embodiment shown in FIG. 7a, the re-deviating optical sub-system includes a first diffraction grating 616, and a second diffraction grating 618 slanted with respect to the input direction. The reflecting component 620 is optically disposed between the second deviating diffraction grating 614 and the first re-deviating diffraction grating 616. The second deviating diffraction grating 614 is optically disposed between the first deviating diffraction grating 612 and the reflecting component 620. The first re-deviating diffraction grating 616 is optically disposed between the second re-deviating diffraction grating 618 and the reflecting component 620. The optical sub-system 600 of FIG. 7a including the diffracting optical sub-system 20 and the re-diffracting optical sub-system 30 is also referred to as a chromatic corrector.

Figure 7B:
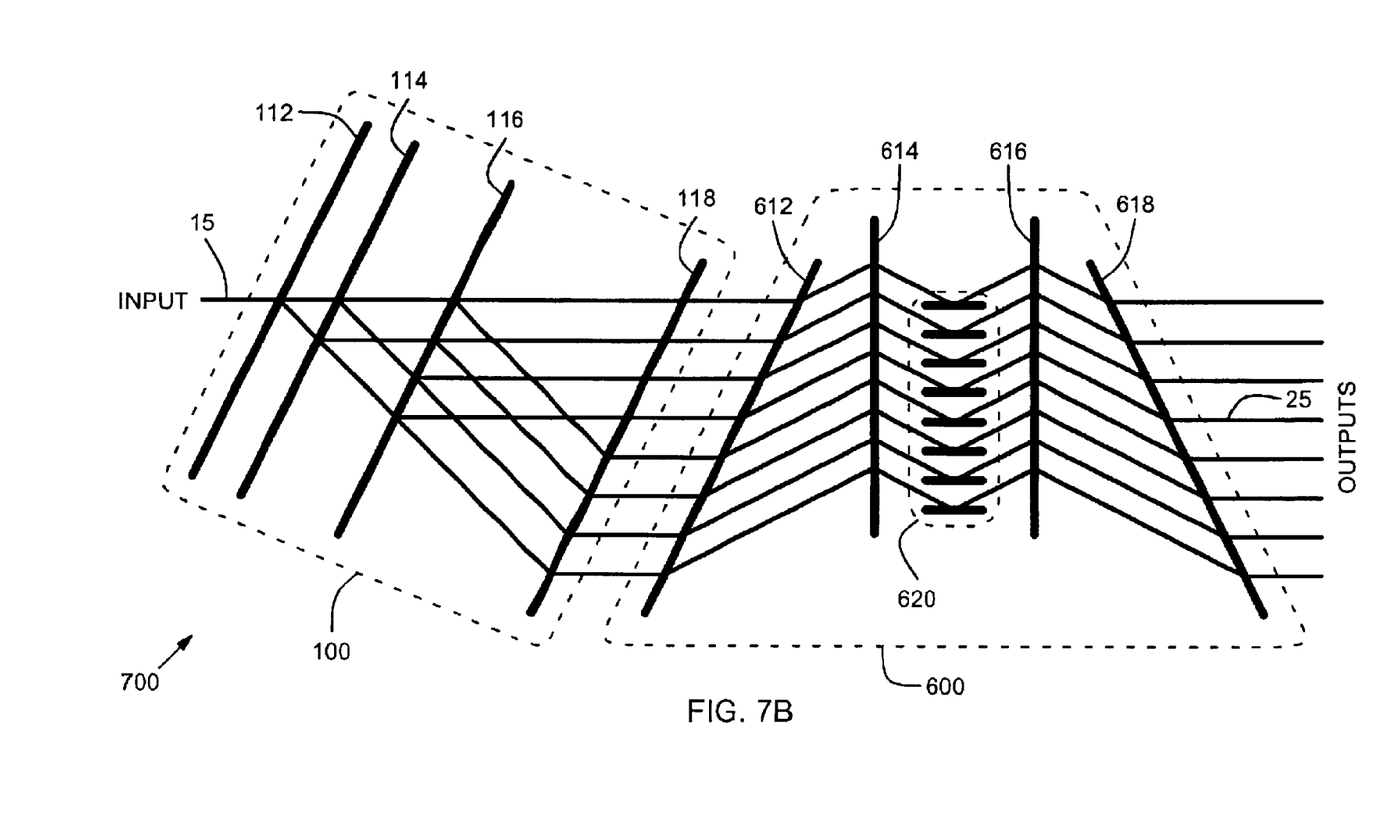
FIG. 7b is a graphical schematic representation of a sixth embodiment of the achromatizing system of this invention being utilized to achromatize the output of a switched grating based optical switch.

During operation of the embodiment shown in FIG. 7a, the output optical beam 25 from the switching/routing optical system 100 of FIG. 7b is deviated by the diffraction grating 612. The optical beam 25 is then further deviated by the diffraction grating 614 in an angular sense opposite that of grating 612. The optical beam 25 is then reflected from reflecting component 624 (the upper surface of a mirror in the mirror array assembly 620, in the embodiment shown in FIG. 7a). (In the embodiment shown in FIG. 7a the mirror array 620 includes mirrors 621, 622, 623, 624, 625, 626, 627, and 628.) After reflecting from the reflecting component 624, the optical beam 25 is then re-deviated by the diffraction grating 616, which is identical in construction to that of 614, and then further re-deviated by the diffraction grating 618, which is identical in construction to that of 612, and propagated to the outputs. The diffracted path length taken by the output optical beam between the diffraction gratings 612 and 618 varies with input position, and therefore the lateral chromatic shift generated by each path varies. (Although optical beam 25 is shown in a particular optical path in FIG. 7a, in the embodiment shown in FIG. 7a optical paths 201, 202, 203, 204, 205, 206, 207, and 208 are also possible. It should be noted that the number of possible optical paths is a design parameter and not a limitation of this invention.) This difference in lateral shift, referenced as ΔY, is measured perpendicular to the direction of-propagation of the beam and can be quantified according to the equation $$\frac{\Delta Y}{Y} \approx 2(\tan\theta_{CD} + \tan\theta_T)\frac{\sin\theta_{CI} - \sin\theta_{CD}}{\cos\theta_{CD}}\frac{\Delta\lambda}{\lambda}$$

This expression is identical to that previously described for the differential lateral chromatic shift generated by embodiments shown in FIGS. 5a and 6a, and the method of its correction is identical in this case.

The additional grating pair 614 and 616 in this embodiment operate to counter the lateral chromatic shift introduced by gratings 612 and 618 on the shortest of these optical paths so that the residual lateral chromatic shift on all outputs is essentially zero. This can be expressed as $$\Delta Y = \frac{T_{CD}}{\cos\theta_{OI}}\Delta\theta_{CD}\frac{\cos\theta_{CD}}{\cos\theta_{OI}} + \frac{T_{OD}}{\cos\theta_{OD}}\Delta\theta_{OD} = 0$$

Given the properties of the diffraction gratings 612, 614, 616, and 618, the required spacing between grating 614 and the center of the mirror array assembly 620 can be given in terms of the spacing between the gratings 612 and 614 as $$T_{OD} = -T_{CD}\frac{\left(\frac{\cos\theta_{OD}}{\cos\theta_{OI}}\right)^3}{1 + \frac{\cos\theta_{CD}}{\cos\theta_{OI}}\frac{\sin\theta_{OI} - \sin\theta_{OD}}{\sin\theta_{CI} - \sin\theta_{CD}}}$$

An achromatic switching/routing system 700 including a grating based switching/routing optical sub-system 100 and the chromatic corrector 600 shown in FIG. 7a is shown in FIG. 7b.

The concatenation of the grating based switching/routing optical sub-system 100 and the chromatic corrector 600 removes the component of the lateral chromatic shift that varies with output as well as the residual constant lateral chromatic shift. The achromatic switching/routing system 700 of FIG. 7b does not require an additional diffraction grating at the input to the switching/routing optical sub-system 100.

Figure 8:
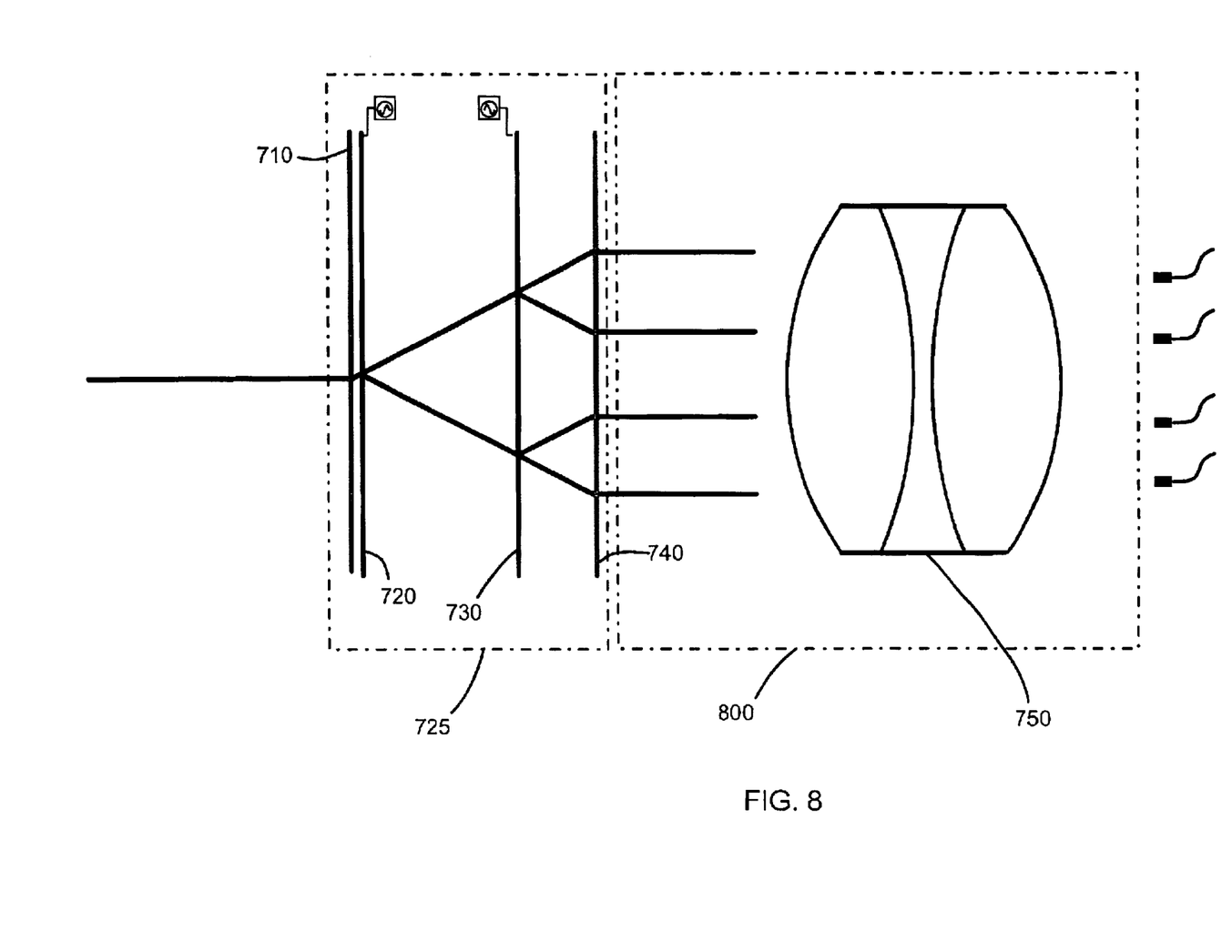
FIG. 8 represents a graphical schematic representation of a seventh embodiment of the achromatizing system of this invention.

A seventh embodiment 800 of the achromatizing system of this invention, shown in FIG. 8, utilizes a conventional refractive dispersive relay lens system 750 in place of diffractive compensation. The first steering grating 710 has half the frequency of the switched gratings 720, 730, and is used to bias the zero-dispersion point to the system center instead of the edge, which is the case of system input along one of the switched grating orders. After propagating through the switched grating cascade 725 of n gratings (n=2 shown), the beams are incident on a steering grating 740. When utilizing volume diffractive elements for the steering grating 740, this grating is pixellated as before. But in this case, neighboring grating regions are identical but with opposite signs of grating fringe tilt angle in order to maximize the diffraction efficiency by satisfying the Bragg Condition.

The output from the steering grating 740 consists of beam paths that are parallel to both the input beam and the optical axis of the dispersive relay lens system 750 and have a lateral dispersion increasing with distance from the central axis, and zero on the central axis.

A dispersive relay system 750 is used to relay the laterally dispersed optical output beams and is designed to introduce lateral color with magnitude equal and opposite to the input lateral dispersion. The function of the dispersive relay system 750 is analogous to the design and function of the "Achromatic Fourier Transform" class of lenses described in the literature. For the case of one-dimensional lateral dispersion, anamorphic elements can be used.

It should be noted that the steering and compensating gratings used in these embodiments can be fixed or switchable, volume or surface relief, etc., pixellated or non-pixellated, in order to obtain advantages such as the reduction in crosstalk into non-selected channels.

It should be further noted that deviation means other than diffractive means can be used for achromatization, as for example, refractive deviation means. However, due to the opposite sign of most refractive dispersions relative to diffractive dispersion, the angular deviations in a refractive compensator will be in the same angular sense as diffraction based switching/routing optical systems.

Figure 9A:
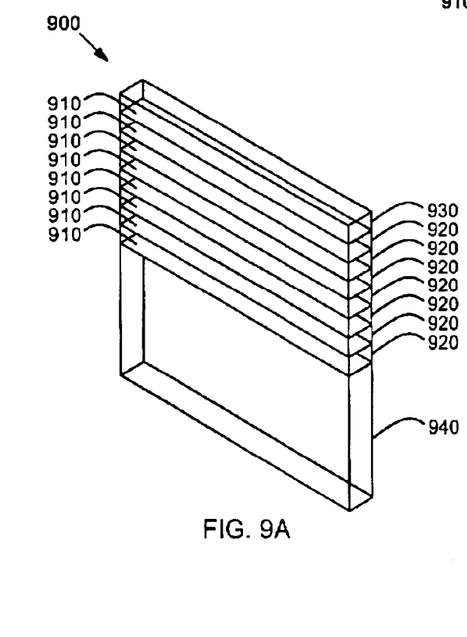
FIG. 9a is a graphical schematic representation of an embodiment of a mirror array component of this invention; and, FIG. 9b illustrates a graphical schematic representation of an embodiment of a multiple mirror array.

An embodiment 900 of the mirror arrays 220, 420, and 620 illustrated in FIGS. 5a, 6a, and 7a respectively is shown in FIG. 9a. Reflective coatings 910, composed of metal and/or dielectric layers, or other materials, are applied to substrates 920 and 930, which are optically transmissive at the operating wavelength of the device, in order to form mirrors. These substrates are then bonded together using epoxy or other bonding agents to produce the mirror array. In some cases, a difference in index of refraction between the substrates and the epoxy can be sufficient to act as the reflective coatings 910 under total internal reflection conditions. The vertical dimension of the substrates 920, measured perpendicular to the mirror surfaces, provides the relative separations of the mirrors, while the vertical dimensions of the substrates 930 and 940 provide vertical offsets for the relative placement of the mirror array with respect to the beams. The horizontal dimension of the substrates 920, 930, and 940, measured parallel to the mirror surfaces, provide for adequate surface area to reflect the full beam extent when projected on the mirror surfaces.

Figure 9B:
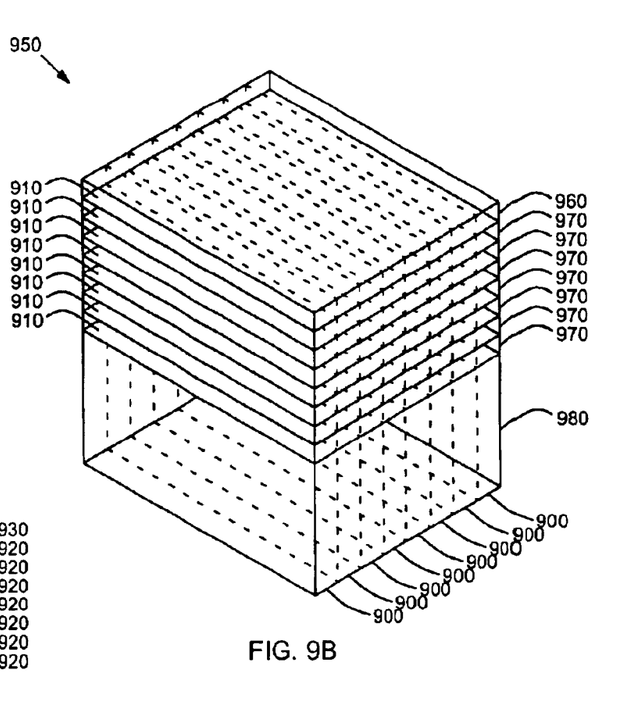

Multiple mirror array components 900 from a bulk mirror array assembly 950 are shown in FIG. 9b. The fabrication of this component is identical to that of the mirror array embodiment 900, with the exception that the horizontal dimension of the substrates 960, 970, and 980 are significantly larger than that of substrates 920, 930, and 940 of the mirror array embodiment 900. This increase in horizontal dimension allows for the component 950 to be cut and polished into numerous mirror array components 900 of desired thickness. The various advantages of this method of bulk fabrication include greater uniformity between mirror array components, improved tolerancing in manufacture, and reduced cost.

Although the invention has been described with respect to various embodiments, it should be realized this invention is also capable of a wide variety of further and other embodiments within the spirit and scope of the appended claims.

What is claimed is:

1. A method for modifying lateral chromatic dispersion of output electromagnetic radiation beams, comprising the steps of:
    deviating an output electromagnetic radiation beam from a switching/routing optical system in a first predetermined direction; and
    re-deviating the deviated output electromagnetic radiation beam in a second predetermined direction, thereby defining a path length of the deflected output electromagnetic radiation beam;
    the path length of the deviated output electromagnetic radiation beam being of a length sufficient to substantially modify the lateral chromatic dispersion.

2. The method of claim 1 wherein the step of deviating the output electromagnetic radiation beam further comprises the step of:
    reflecting the deviated output electromagnetic radiation beam.

3. The method of claim 2 wherein the second predetermined direction is optically parallel to an input direction.

4. The method of claim 1 wherein the step of deviating the output electromagnetic radiation beam comprises the steps of:
    rendering the deviated electromagnetic radiation beam parallel to an input beam;
    subsequently deviating the deviated electromagnetic radiation beam in a direction optically anti-parallel to the initial direction; and,
    reflecting the subsequently deviated output electromagnetic radiation beam in order to redirect the subsequently deviated output electromagnetic radiation beam.

5. The method of claim 1 wherein the step of deviating the output electromagnetic radiation beam comprises the step of:
    diffracting the output electromagnetic radiation beam; and
    wherein the step of re-deviating the deflected output electromagnetic radiation beam comprises the step of:
    diffracting the deflected output electromagnetic radiation beam.

6. The method of claim 1 further comprising the step of:
    biasing a zero dispersion point prior to receiving an input beam at an optical switching/routing system, said optical switching/routing system producing the output electromagnetic radiation beam;
    and, wherein the step of deviating the output electromagnetic radiation beam further comprises the steps of:
        rendering the deviated output beam optically parallel to the input beam; and
        propagating the deviated output beam through a refractive dispersion compensating system;
    and, wherein the step of re-deviating the deviated output electromagnetic radiation beam is also performed by the propagation of the deviated output beam through the refractive dispersion compensating system.

7. An achromatic switching/routing system comprising:
    a switching/routing optical sub-system capable of receiving an input electromagnetic radiation beam and directing the input electromagnetic radiation beam to a selectable spatial output location, the directed electromagnetic radiation beam emanating from the selected spatial output location being an output electromagnetic radiation beam;
    a deviating optical sub-system optically disposed to receive the output electromagnetic radiation beam and capable of deviating the output electromagnetic radiation beam in a first predetermined direction; and,
    a re-deviating optical sub-system optically disposed to receive the deviated output electromagnetic radiation beam and capable of re-deviating the deviated output electromagnetic radiation beam to a second predetermined direction, said re-deviating defining a path length of the deviated output electromagnetic radiation beam;
    the path length of the deviated output electromagnetic radiation beam being of a length sufficient to substantially modify the lateral chromatic dispersion induced by the optical switching/routing sub-system.

8. The achromatic switching/routing system of claim 7 wherein the deviating optical sub-system comprises a deviating diffraction grating; and, the re-deviating optical sub-system comprises a re-deviating diffraction grating.

9. The achromatic switching/routing system of claim 8 wherein the deviating diffraction grating comprises a volume diffraction grating; and,
    wherein the re-deviating diffraction grating comprises a volume diffraction grating.

10. The achromatic switching/routing system of claim 7 wherein the deviating optical subsystem further comprises:
    a reflecting component capable of redirecting the deviated output electromagnetic radiation beam.

11. The achromatic switching/routing system of claim 10 wherein the second predetermined direction is optically parallel to an input direction.

12. The achromatic switching/routing system of claim 11 wherein the deviating optical sub-system further comprises:
   a deviating diffraction grating slanted with respect to the input direction, the deviating diffraction grating capable of receiving the output electromagnetic radiation beam from the optical switching/routing system; and,
   wherein the re-deviating optical sub-system comprises a re-deviating diffraction grating slanted with respect to the input direction;
   and, wherein the reflecting component is optically disposed between the deviating diffraction grating and the re-deviating diffraction grating.

13. The achromatic switching/routing system of claim 11 wherein the deviating optical sub-system further comprises:
   a first deviating diffraction grating slanted with respect to the input direction, the first deviating diffraction grating capable of receiving the output electromagnetic radiation beam from the optical switching/routing system; and,
   a second deviating diffraction grating; and,
wherein the re-deviating optical sub-system comprises:
   a first re-deviating diffraction grating; and
   a second re-deviating diffraction grating slanted with respect to the input direction;
the reflecting component being optically disposed between the second deviating diffraction grating and the first re-deviating diffraction grating;
the second deviating diffraction grating being optically disposed between the first deviating diffraction grating and the reflecting component; and,
the first re-deviating diffraction grating being optically disposed between the second re-deviating diffraction grating and the reflecting component.

14. The achromatic switching/routing system of claim 11 wherein the deviating optical sub-system further comprises:
   a deviating component capable of subsequently deviating the output electromagnetic radiation beam in order to render a direction of the subsequently deviated output electromagnetic radiation beam optically anti-parallel to the initial deviation; and,
   a reflecting component capable of reflecting the subsequently deviated output electromagnetic radiation beam in order to redirect the subsequently deviated output electromagnetic radiation beam.

15. The achromatic switching/routing system of claim 7 wherein the deviating optical sub-system comprises:
   a first deviating component capable of biasing a zero dispersion point prior to receiving an input beam at the optical switching/routing system;
   a second deviating component capable of deviating the output beam in order to render the deviated output beam optically parallel to the input beam; and,
   a refractive dispersion compensating sub-system capable of receiving the deviated output electromagnetic radiation beam;
   the refractive dispersion compensating sub-system also constituting the re-deviating optical sub-system.

16. The achromatic switching/routing system of claim 15 wherein the refractive dispersion compensating sub-system comprises an achromatic Fourier Transform optical system.

17. The achromatic switching/routing system of claim 7 further comprising:
   a correcting deviation component optically disposed before an input side of the switching/routing optical sub-system and capable of receiving the input electromagnetic radiation beam and providing the deviated input electromagnetic radiation beam to the switching/routing optical sub-system.

18. A lateral chromatic dispersion compensating system comprising:
   a deviating grating optically disposed to receive at least one output electromagnetic radiation beam from a switching/routing optical system and capable of rendering the at least one output electromagnetic radiation beam optically parallel to an input electromagnetic radiation beam; and
   an optical relay system optically disposed to receive the at least one output electromagnetic radiation beam from the deviating grating;
   the lateral color of the optical relay system being sufficient to substantially compensate the lateral chromatic dispersion of the at least one output electromagnetic radiation beam.

19. A method for reducing the lateral chromatic shift introduced by a grating based switching/routing optical system, the method comprising the step of:
   maximizing an input angle of incidence of an input beam; the input angle of incidence being an angle between a direction of propagation of an input electromagnetic radiation beam and a perpendicular to a first grating from the grating based switching/routing optical system.

20. A method for forming a reflecting component capable of redirecting a plurality of electromagnetic radiation beams, the method comprising the steps of:
   applying reflective coatings to a surface of each of at least two optically transmissive substrates, resulting in a coated surface and an opposite uncoated surface in each of the at least two substrates;
   bonding the uncoated surface of one of the at least two substrates to the coated surface of another one of the at least two substrates;
   wherein a dimension of the at least two substrates along each of the coated surfaces is selected to substantially receive one beam from the plurality of electromagnetic radiation beams.

* * * * *